United States Patent
Wegner

(10) Patent No.: US 10,851,699 B2
(45) Date of Patent: Dec. 1, 2020

(54) HEAT EXCHANGER FOR AN INTERNAL COMBUSTION ENGINE

(71) Applicant: Mahle International GmbH, Stuttgart (DE)

(72) Inventor: Juergen Wegner, Eislingen/Fils (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/415,565

(22) Filed: May 17, 2019

(65) Prior Publication Data

US 2019/0353084 A1 Nov. 21, 2019

(30) Foreign Application Priority Data

May 18, 2018 (DE) .................. 10 2018 207 902

(51) Int. Cl.
*F01P 7/02* (2006.01)
*F01P 1/06* (2006.01)
*F01P 11/10* (2006.01)

(52) U.S. Cl.
CPC .................... *F01P 7/02* (2013.01); *F01P 1/06* (2013.01); *F01P 11/10* (2013.01)

(58) Field of Classification Search
CPC ............. F02B 29/0462; F02B 29/0475; F02B 29/0456; F02B 29/045
See application file for complete search history.

(56) References Cited

U.S. PATENT DOCUMENTS

| | | |
|---|---|---|
| 8,794,299 B2 | 8/2014 | Barfknecht et al. |
| 9,835,080 B2 | 12/2017 | Bauer et al. |
| 9,921,005 B2 | 3/2018 | Bluetling et al. |
| 2007/0193731 A1* | 8/2007 | Lamich .................. F28D 7/1692 165/149 |
| 2009/0139703 A1* | 6/2009 | Vet ........................ F28F 9/0229 165/173 |
| 2012/0018127 A1 | 1/2012 | Iwasaki |

(Continued)

FOREIGN PATENT DOCUMENTS

| | | |
|---|---|---|
| DE | 102005012761 A1 | 9/2006 |
| DE | 11 2008 000 487 T5 | 4/2010 |

(Continued)

OTHER PUBLICATIONS

English abstract for DE-102005012761.

*Primary Examiner* — Long T Tran
(74) *Attorney, Agent, or Firm* — Fishman Stewart PLLC

(57) ABSTRACT

A heat exchanger for an internal combustion engine may include a plurality of first tubular bodies and a plurality of second tubular bodies for being flowed through by a gas. A plurality of first intermediate spaces may be disposed between the plurality of first tubular bodies defining a plurality of first coolant paths for being flowed through by a coolant. A plurality of second intermediate spaces may be disposed between the plurality of second tubular bodies defining a plurality of second coolant paths for being flowed through by the coolant. The plurality of first coolant paths may be fluidically connected to a first coolant distributor configured to distribute the coolant to the first coolant paths and a first coolant collector. The plurality of second coolant paths may be fluidically connected to a second coolant distributor configured to distribute the coolant to the second coolant paths and a second coolant collector.

20 Claims, 2 Drawing Sheets

(56) References Cited

U.S. PATENT DOCUMENTS

| | | | |
|---|---|---|---|
| 2012/0285423 A1* | 11/2012 | Nguyen | F28F 9/002 123/542 |
| 2013/0206364 A1* | 8/2013 | Fehrenbach | F28D 7/0091 165/104.11 |
| 2015/0068717 A1* | 3/2015 | Gluck | F28D 9/0056 165/166 |
| 2015/0129183 A1 | 5/2015 | Peskos et al. | |
| 2016/0097596 A1* | 4/2016 | Stewart | F28D 9/0056 165/175 |
| 2018/0128555 A1* | 5/2018 | Kinder | F28D 9/0056 |

FOREIGN PATENT DOCUMENTS

| | | |
|---|---|---|
| DE | 202011002197 U1 | 2/2012 |
| DE | 10 2012 008 700 A1 | 10/2013 |
| DE | 102012213164 A1 | 1/2014 |

\* cited by examiner

HEAT EXCHANGER FOR AN INTERNAL COMBUSTION ENGINE

CROSS-REFERENCE RELATED APPLICATIONS

This application claims priority to German Patent Application No. DE 10 2018 207 902.1 filed on May 18, 2018, the contents of which are hereby incorporated by reference in their entirety.

TECHNICAL FIELD

The invention relates to a heat exchanger for an internal combustion engine. The invention, furthermore, relates to an internal combustion engine having such a heat exchanger.

BACKGROUND

Supercharged internal combustion engines are increasingly gaining importance in modern motor vehicles since with the help of such supercharging the power density based on the cubic capacity and based on the fuel consumption can be substantially increased. There is therefore the tendency of increasingly equipping vehicles even with smaller engines with suitable supercharging devices in order to increase their power output or lower the fuel consumption. Another tendency that is observed is downsizing the engines with the same power output and also lower their fuel consumption. Supercharged internal combustion engines are therefore regularly equipped with a heat exchanger in order to cool charge air that is supercharged with a corresponding supercharging device, such as for example an exhaust gas turbocharger. Such a cooling of the charge air increases the power output of the internal combustion engine, reduces the fuel consumption and the pollutant emissions of the same and reduces the thermal load on the internal combustion engine.

DE 10 2012 008 700 A1 discloses for example a heat exchanger in the form of a charge air cooler, in which compressed charge air is cooled by means of a cooling liquid in at least two stages being adjacent to each other. For the charge air, flow passages and for the coolant flow paths are provided. The heat exchanger is formed by a single stack of one-part plates.

Conventional charge air coolers are typically realised as heat exchangers which are part of a coolant circuit and through which coolant flows, which in turn is thermically coupled to the charge air to be cooled. The heat extracted from the charge air is absorbed by the coolant.

Along a stacking direction, heat exchangers comprise tubular bodies arranged stack-like on top of one another, through which charge air to be cooled can flow. Between the individual tubular bodies, coolant passages are provided, through which in turn coolant flows. In other words, coolant passages and tubular bodies alternate along the stacking direction. Often, the flow through the coolant paths of conventional heat exchangers is the so-called "Z-flow" or "U-flow", wherein the coolant flows through an inlet and flows out through an outlet.

However, in such conventional heat exchangers an inefficient heat transfer or even a boiling of the coolant in so-called dead flow regions occurs in the coolant passages because of a heterogeneous coolant distribution typically caused by an asymmetrical and inhomogeneous flow pattern of the coolant and because of deeper coolant paths. In addition, particularly when using flow guide plates for guiding the coolant in the coolant paths, an undesired loss of pressure in the coolant circuits often occurs. When, by contrast, in order to avoid the abovementioned problems, multiple sufficiently small-dimensioned heat exchangers are used, this measure is accompanied by an increased need of installation space and also an increased number of required components.

SUMMARY

It is therefore an object of the present invention to create an improved embodiment of a heat exchanger which, compared with conventional heat exchangers, is characterized by an improved flow of the coolant through the coolant paths, such that in particular the formation of dead flow regions and accompanied by this a boiling of the coolant is avoided as much as possible. At the same time, the heat exchanger is to be of a compact design and cost-effectively producible.

The mentioned objects are solved through the subject of the independent claim(s). Preferred embodiments are subject of the dependent claim(s).

Accordingly, the basic idea of the invention is to complement a heat exchanger equipped with a first coolant distributor and with a first coolant collector by a second, i.e. additional coolant distributor and by a second, i.e. additional second coolant collector in such a manner that the additional second coolant distributor and the additional second coolant collector are each substantially arranged opposite the first coolant distributor and the first coolant collector respectively and are assigned first and second coolant paths that are fluidically separated from one another. Largely or completely avoiding the formation of dead flow regions, the coolant can thus be guided through the respective coolant paths. In this way, an undesired boiling of the coolant is prevented in particular.

The heat exchanger according to the invention proposed here thus ensures an improved and more efficient heat transfer. The heat exchanger according to the invention proposed here can be employed as a charge air cooler with compact design structure so that for the arrangement of the charge air cooler or heat exchanger in a vehicle, only very little installation space has to be reserved. At the same time, because of its very simple design structure, the heat exchanger introduced here can be easily produced which results in cost advantages during manufacturing.

A heat exchanger according to the invention comprises a plurality of first tubular bodies for being flowed through by a gas, in particular charge air, extending along a longitudinal direction, which are arranged spaced from one another along a stacking direction perpendicular to the longitudinal direction. The heat exchanger, furthermore, comprises a plurality of second tubular bodies for being flowed through by the gas, in particular charge air, extending along the longitudinal direction, which are arranged spaced from one another along the stacking direction. In the present context, the term "plurality" includes all heat exchangers having at least two of each tubular bodies. The second tubular bodies are arranged next to the first tubular bodies along a transverse direction perpendicular to the stacking direction and perpendicular to the longitudinal direction. The direction vectors of the longitudinal direction, the transverse direction and the stacking direction are thus basic vectors of a three dimensional Cartesian coordinate system. In the first intermediate spaces arranged between the first tubular bodies along the stacking direction, first coolant paths for a coolant to flow through are arranged. In the second intermediate spaces arranged between the second tubular bodies along the stacking direction, second coolant paths for the coolant to flow through are arranged. The first coolant paths are fluidically connected to a first coolant distributor for distributing the coolant to the first coolant paths and to a first coolant collector for collecting the coolant after the coolant has flowed through the first coolant paths. The second coolant paths are fluidically connected to a second coolant distributor for distributing the coolant to the second coolant paths and to a second coolant collector for collecting the coolant after the coolant has flowed through the second coolant paths. The first and the second coolant distributor are located opposite one another along the transverse direction and the first and the second coolant collector are located opposite one another along the transverse direction.

According to an advantageous embodiment, at least one partition wall extending along the stacking direction is arranged between the first and second tubular bodies, wherein the partition wall fluidically separates the first coolant paths from the second coolant paths. In this way, the first and second coolant paths can be fluidically separated from one another along the transverse direction in a technically simple manner. In particular, a complex provision of two separate housings for limiting the first and second coolant paths can be omitted in this way.

Particularly expediently, the first and second tubular bodies are arranged in a common housing. The separating wall mentioned above is practically part of this housing. In this way, the first and second coolant paths can be limited on the outside in the transverse direction in a manner that is cost-effective since simple in terms of production. Furthermore, the two coolant distributors and the two coolant collectors can be easily connected fluidically to the first and second coolant paths respectively.

According to a preferred embodiment, the first coolant distributor and the first coolant collector are arranged in the region of longitudinal ends of the first tubular bodies, wherein the longitudinal ends are located opposite one another along the longitudinal direction. Furthermore, the second coolant distributor and the second coolant collector are arranged in the region of longitudinal ends of the tubular bodies, wherein the longitudinal ends are located opposite one another along the longitudinal direction. This proves to be advantageous in order to achieve a symmetrical and thus particularly homogeneous flow of the coolant through the first and second coolant paths.

According to a further preferred embodiment, the first coolant distributor and the first coolant collector are arranged on a first transverse side of the heat exchanger, wherein the first transverse side is located opposite a second transverse side of the heat exchanger along the transverse direction, on which the second coolant distributor and the second coolant collector are arranged. This allows a particularly deep flow of coolant through the two coolant paths in the transverse direction.

Particularly advantageously, the two coolant distributors and the two coolant collectors are arranged in a viewing direction onto the heat exchanger along the stacking direction in the region of the four corners of a virtual rectangle. This likewise ensures a particularly symmetrical and thus homogenous flow of coolant through the first and second coolant paths.

Practically, the two coolant distributors and the two coolant collectors each comprise a nozzle extending in the stacking direction, wherein each nozzle has a nozzle opening pointing in the stacking direction. Since all four nozzles point in the same direction, the two coolant distributors and the two coolant collectors of the heat exchanger can be installation space-savingly connected to a coolant circuit.

Particularly practically, the nozzles of the two coolant distributors and of the two coolant collectors project along the stacking direction over a first and second tubular body, wherein the first and the second tubular body are each a last tubular body of the stacks of the first and second tubular bodies respectively. This makes it easy for a worker to connect cooling lines to the nozzles in order to integrate the first and second coolant paths respectively in the said coolant.

According to a preferred embodiment, the first and second tubular bodies are configured symmetrically regarding a symmetry plane extending perpendicularly to the transverse direction and, alternatively or additionally, arranged symmetrically to one another. This ensures an even more homogeneous flow of the coolant through the first and second coolant paths, as a result of which undesirable boiling effects are counteracted.

According to a further preferred embodiment, the first and second coolant paths are configured symmetrically regarding a symmetry plane extending perpendicularly to the transverse direction and, alternatively or additionally, arranged symmetrically to one another. This embodiment can be produced particularly easily and therefore cost-effectively.

According to a further advantageous embodiment, a second tubular body is arranged along the transverse direction next to each first tubular body, which together form a tubular body pair, wherein the two tubular bodies of at least one tubular body pair are substantially, preferentially completely, configured identically. Thus, identical parts can be used for the two tubular bodies of each respective tubular body pair, which results in cost advantageous.

According to a further advantageous embodiment, a second coolant path is arranged along the transverse direction next to each first coolant path, which together form a coolant path pair, wherein the two coolant paths of at least one coolant path pair are substantially, preferentially completely, configured identically. Such an identical design of the two coolant paths of each coolant path pair also results in substantial simplifications during the manufacture of the heat exchanger.

Practically, the first and second tubular bodies of the heat exchanger are therefore configured as identical parts.

Particularly practically, at least one first and, alternatively or additionally, at least one second tubular body, preferentially all first and, alternatively or additionally, all second tubular bodies are configured as flat tubes, which have a tube height measured along the stacking direction, which amounts to a maximum of a fifth, preferentially a maximum of a tenth of a tube width measured along the transverse direction. In this way, the installation space requirement of the heat exchanger in the stacking direction can be kept low.

The invention, furthermore, relates to an internal combustion engine for a motor vehicle having a heat exchanger introduced above. The advantageous of the heat exchanger according to the invention explained above therefore also apply to an internal combustion engine according to the invention. The first and second tubular bodies are incorporated in an exhaust gas or a fresh air system.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
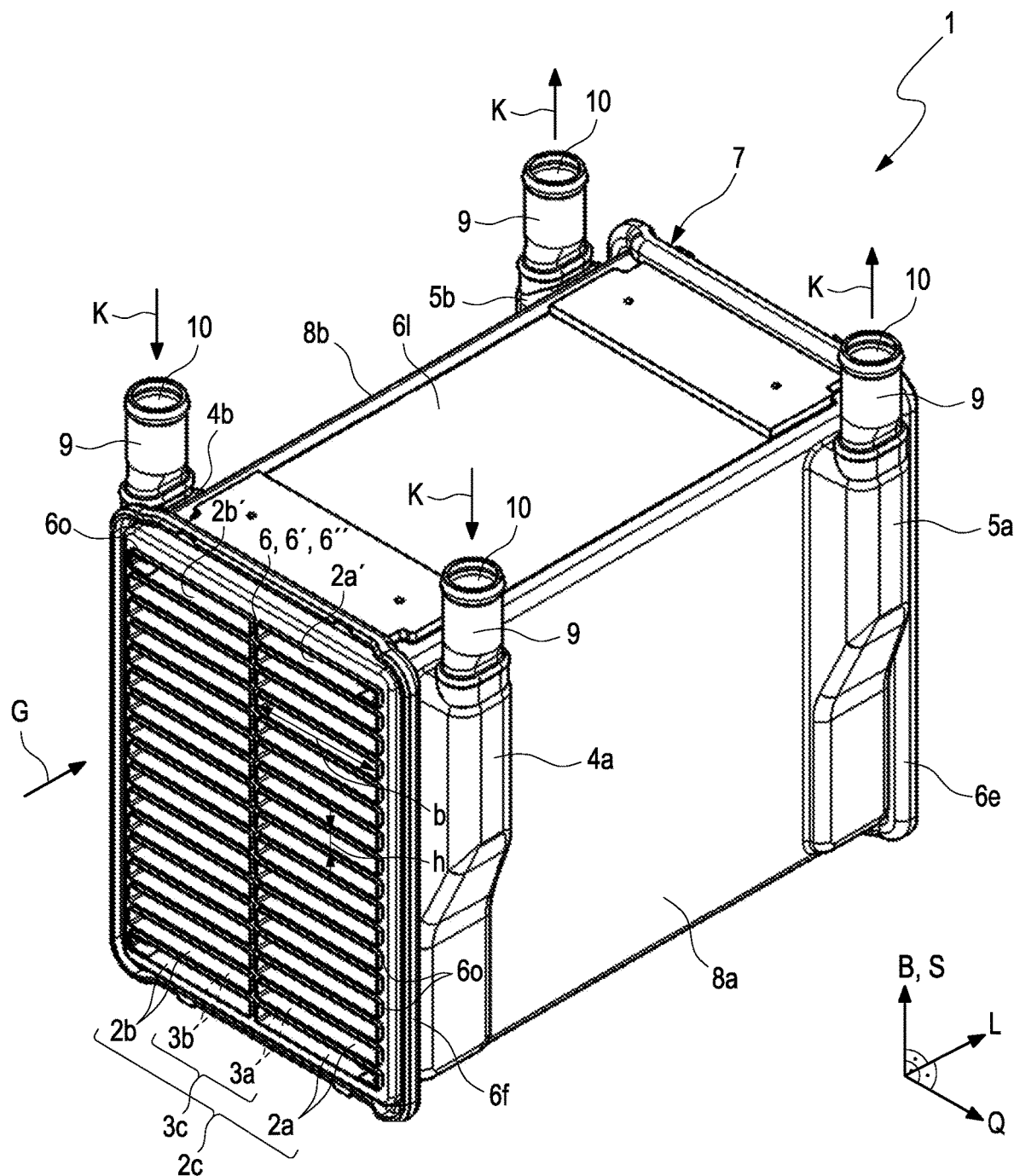
FIG. 1 shows an example of a heat exchanger according to the invention in a perspective representation.

FIG. 1 illustrates an example of a heat exchanger 1 according to the invention in a perspective representation. The heat exchanger 1 can be configured as a charge air cooler and comprises a plurality of first and second tubular bodies 2a, 2b extending along a longitudinal direction L through which a gas, in particular charge air can flow. The first tubular bodies 2a are arranged spaced from one another along a stacking direction S perpendicularly to the longitudinal direction L. Likewise, the second tubular bodies 2a are arranged spaced from one another along the stacking direction S perpendicularly to the longitudinal direction L. In addition, the second tubular bodies 2b arranged next to the first tubular bodies 2a along a transversely direction Q perpendicularly to the stacking direction S and perpendicularly to the longitudinal direction L. In the example of FIG. 1, seventeen first and second tubular bodies 2a, 2b each are exemplarily shown; obviously, another number of tubular bodies 2a, 2b is also possible in versions.

By way of first intermediate spaces provided along the stacking direction S between the first tubular bodies 2a, first coolant paths 3a for being flowed through by coolant K are formed. By way of second intermediate spaces provided along the stacking direction S between the second tubular bodies 2b, second coolant paths 3b for being flowed through by coolant K are formed. The first coolant paths 3a are fluidically separated from the second coolant paths 3b. The first coolant paths 3a are fluidically connected to a first coolant distributor 4a for distributing the coolant K over the first coolant paths 3a and with a first coolant collector 5a for collecting the coolant K following the flow through the first coolant paths 3a. The second coolant paths 3b are fluidically connected to a second coolant distributor 4b for distributing the coolant K over the second coolant paths 3b and to a second coolant collector 5b for collecting the coolant K after the flow through the second coolant paths 3b. The first and the second coolant distributor 4a, 4b lie opposite one another along the transverse direction Q. Likewise, the first and the second coolant collector 5a, 5b lie opposite one another along the transverse direction Q. Between the first and second tubular bodies 2a, 2b a separating wall 6 extending along the stacking direction S is arranged, which fluidically separates the first coolant paths 3a from the second coolant paths 3b.

The first and second tubular bodies 2a, 2b can be additionally arranged in a common housing 7, wherein the separating wall 6 is part of this housing 7. The housing 7 can comprise two housing sidewalls 6''', 6'''', which limit the heat exchanger 1 in the transverse direction Q. In this way, the coolant paths 3a, 3b can each be limited in the transverse direction Q on the outside and sealed in a fluid-tight manner except for openings for the coolant K to flow through.

The housing 7 can also comprise a housing bottom 6b and a housing lid 61 which both limit the heat exchanger in the stacking direction S. The housing 7 can further comprise a housing front wall 6f and a housing end wall 6e which both limit the heat exchanger in the longitudinal direction L. The first and second tubular bodies 2a, 2b can be inserted into the housing 7 and subsequently soldered and welded to the same during the course of the assembly of the heat exchanger 1. Particularly, the front wall 6f and the end wall 6e can comprise openings 6o into which the tubular bodies 2a, 2b can be inserted.

The first coolant distributor 4a and the first coolant collector 5a can be arranged in the region of longitudinal ends 11a of the first tubular bodies 2a wherein the longitudinal ends 11a are located opposite one another along the longitudinal direction L. The second coolant distributor 4b and the second coolant collector 5b can be likewise arranged in the region of the longitudinal ends 11b of the tubular bodies 2b wherein the longitudinal ends 11b are located opposite one another in the longitudinal direction L.

The first coolant distributor 4a and the first coolant collector 5a can be arranged on a first transverse side 8a of the heat exchanger 1, wherein the first transverse side 8a is located opposite to a second transverse side 8b of the heat exchanger along the transverse direction Q, on which in turn the second coolant distributor 4b and the second coolant collector 5b can be arranged. The two coolant distributors 4a, 4b and the two coolant collectors 5a, 5b can also be arranged in a viewing direction B onto the heat exchanger 1 along the stacking direction S in the region of the four corners of a virtual rectangle 12.

The two coolant distributors 4a, 4b and the two coolant collectors 5a, 5b each comprise a nozzle 9 extending in the stacking direction S, wherein each nozzle 9 preferably comprises a nozzle opening 10 facing in the stacking direction S. In the exemplary scenario, the nozzles 9 of the two coolant distributors 4a, 4b and of the two coolant collectors 5a, 5b project over a first and second tubular body 2a', 2b' along the stacking direction S, wherein this first and the second tubular bodies 2a', 2b' in each case is an, in stacking direction, outermost tubular body of the stack of first and second tubular bodies 2a, 2b respectively stacked on top of one another. With regard to a symmetry plane E extending perpendicularly to the transverse direction Q, which is preferably identical to the symmetry plane E, the first and second tubular bodies 2a, 2b can be configured symmetrically and, alternatively or additionally, be arranged symmetrically to one another. Likewise, the first and second coolant paths 3a, 3b can be configured symmetrically relative to a symmetry plane E' extending perpendicularly to the transverse direction Q, which is preferably identical to the symmetry plane E, and, alternatively or additionally, be arranged symmetrically to one another.

In the example of FIG. 1, a second tubular body 2b is arranged along the transverse direction Q next to each first tubular body 2a. Together, the first and second tubular bodies 2a, 2b each arranged along the transverse direction Q next to one another, each form a tubular body pair 2c. The two tubular bodies 2a, 2b of the tubular body pairs 2c are substantially configured identically. In the example of FIG. 1, the tubular bodies 2a, 2b of a tubular body pair 2c are additionally arranged at the same height. A second coolant path 3b is likewise arranged along the transverse direction Q next to each first coolant path 3a. Together, the respective first and second coolant paths 3a, 3b which are each arranged along the transverse direction Q next to one another each form a coolant path pair 3c. The two coolant paths 3a, 3b of a coolant path pair 3c are substantially configured identically. In the example of FIG. 1, the coolant paths 3a, 3b of a coolant path pair 3c are additionally arranged at the same height. The first and second tubular bodies 2a, 2b can also be configured as identical parts. At least one first and alternatively or additionally one second tubular body 2a, 2b are preferably configured as flat tubes. It is also conceivable that even all first and, alternatively or additionally, all second tubular bodies 2a, 2b are configured as flat tubes. The flat tubes 2a, 2b have a tube height h measured along the stacking direction S which for example amounts to a maximum of a fifth or a maximum of a tenth of a tube width b of the tubular bodies 2a, 2b measured along the transverse direction Q.

In a further development or version of the example (not shown), flow guide plates or a rib structure with ribs for deflecting the coolant K can be provided in the first and second coolant paths 3a, 3b, on which the tube walls of the first or second tubular bodies 2a, 2b adjoining in the stacking direction S can additionally support themselves.

Figure 2:
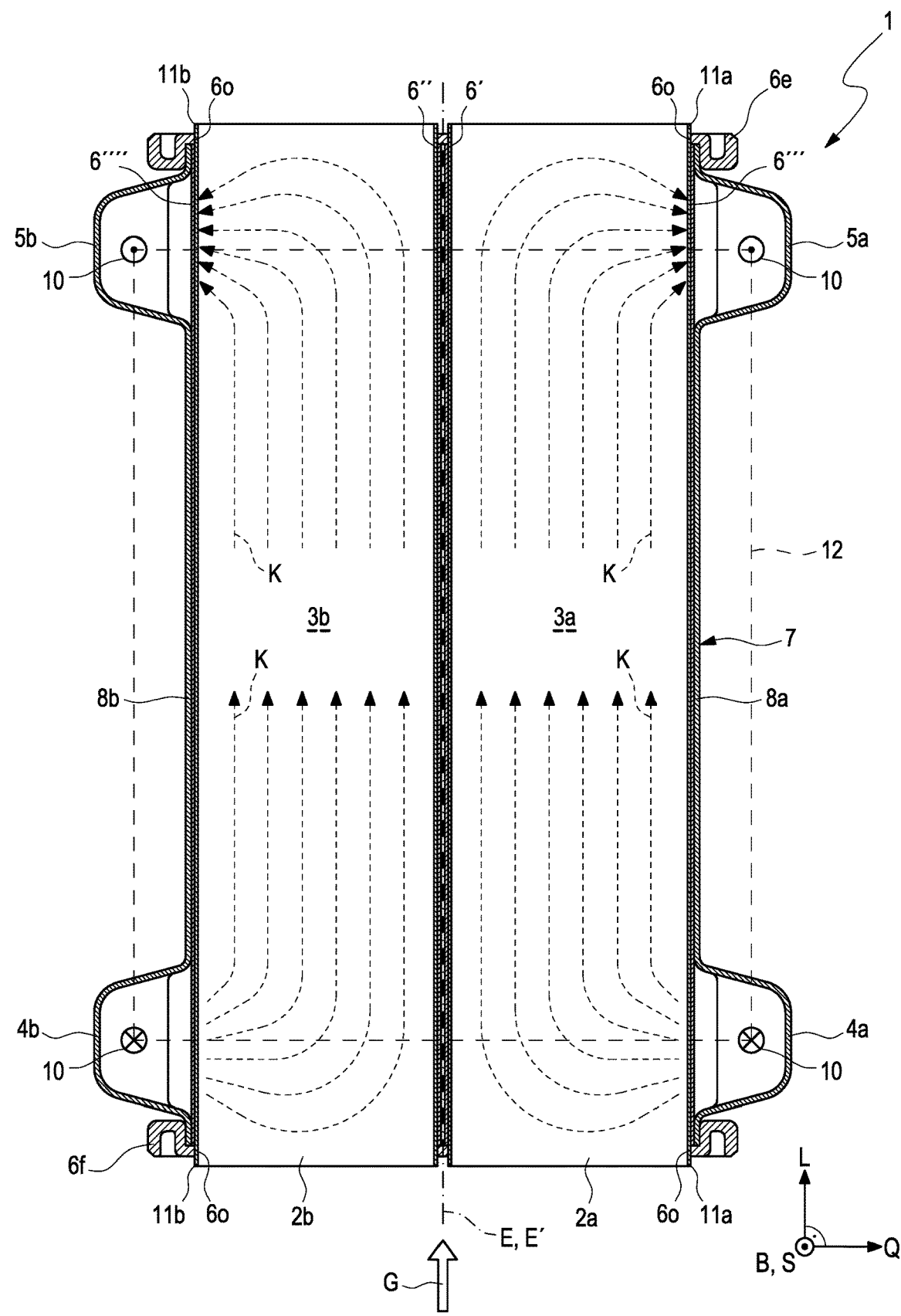
FIG. 2 shows a sectional representation of the heat exchanger in a cross section of FIG. 1 perpendicularly to the stacking direction.

FIG. 2 illustrates a sectional representation of the heat exchanger 1 of FIG. 1 in viewing direction B along the stacking direction S through a tubular body 2a and a tubular body 2b. The first and second tubular bodies 2a, 2b are arranged next to one another in the transverse direction Q. In FIG. 2, a single first coolant path 3a arranged in the intermediate spaces between the first tubular bodies 2a for coolant K to flow through and a single second coolant path 3b arranged in the intermediate spaces between the second tubular bodies 2b for coolant K to flow through are noticeable underneath the tubular body 2a and the tubular body 2b on top of the sectional view (dashed lines).

According to FIG. 2, the first and second coolant paths 3a, 3b are fluidically sealed and fluidically separated from one another by a first separating wall 6' arranged between the first and second tubular bodies 2a, 2b and extending along the longitudinal direction L and by a second separating wall 6" likewise extending along the longitudinal direction L. The separating walls 6', 6" are again spaced from one another and connected to one another by spaces.

The invention claimed is:

1. A heat exchanger for an internal combustion engine, comprising:
a plurality of first tubular bodies for being flowed through by a gas, the plurality of first tubular bodies extending along a longitudinal direction and arranged spaced from one another along a stacking direction extending perpendicular to the longitudinal direction;
a plurality of second tubular bodies for being flowed through by the gas, the plurality of second tubular bodies extending along the longitudinal direction and arranged spaced from one another along the stacking direction;
the plurality of second tubular bodies arranged next to the plurality of first tubular bodies along a transverse direction extending perpendicular to the stacking direction and perpendicular to the longitudinal direction;
a plurality of first intermediate spaces disposed along the stacking direction between the plurality of first tubular bodies, the plurality of first intermediate spaces defining a plurality of first coolant paths for being flowed through by a coolant;
a plurality of second intermediate spaces disposed along the stacking direction between the plurality of second tubular bodies, the plurality of second intermediate spaces defining a plurality of second coolant paths for being flowed through by the coolant;
the plurality of first coolant paths fluidically connected to a first coolant distributor configured to distribute the coolant to the plurality of first coolant paths and to a first coolant collector structured and arranged to collect the coolant after the coolant has flowed through the plurality of first coolant paths;
the plurality of second coolant paths fluidically connected to a second coolant distributor configured to distribute the coolant to the plurality of second coolant paths and to a second coolant collector structured and arranged to collect the coolant after the coolant has flowed through the plurality of second coolant paths; and
wherein the first coolant distributor and the second coolant distributor are arranged opposite one another along the transverse direction and wherein the first coolant collector and the second coolant collector are arranged opposite one another along the transverse direction.

2. The heat exchanger according to claim 1, further comprising, arranged between the plurality of first tubular bodies and the plurality of second tubular bodies, at least one separating wall extending along the stacking direction fluidically separating the plurality of first coolant paths from the plurality of second coolant paths.

3. The heat exchanger according to claim 2, wherein the plurality of first tubular bodies and the plurality of second tubular bodies are arranged in a common housing, and wherein the at least one separating wall is part of the housing.

4. The heat exchanger according to claim 1, wherein at least one of:
the first coolant distributor and the first coolant collector are arranged in a region of longitudinal ends of the plurality of first tubular bodies, the longitudinal ends of the plurality of first tubular bodies disposed opposite one another along the longitudinal direction; and
the second coolant distributor and the second coolant collector are arranged in a region of longitudinal ends of the plurality of second tubular bodies, the longitudinal ends of the plurality of second tubular bodies disposed opposite one another along the longitudinal direction.

5. The heat exchanger according to claim 1, wherein the first coolant distributor and the first coolant collector are arranged on a first transverse side, wherein the first transverse side and a second transverse side are disposed on opposite sides of the plurality of first tubular bodies and the plurality of second tubular bodies along the transverse direction, and wherein the second coolant distributor and the second coolant collector are arranged on the second transverse side.

6. The heat exchanger according to claim 1, wherein the first coolant distributor, the second coolant distributor, the first coolant collector, and the second coolant collector each include a nozzle extending in the stacking direction having a nozzle opening facing the stacking direction.

7. The heat exchanger according to claim 6, wherein the nozzle of each of the first coolant distributor, the second coolant distributor, the first coolant collector, and the second coolant collector project over a first tubular body and a second tubular body along the stacking direction, and wherein the first tubular body and the second tubular body are a last tubular body of a stack of the plurality of first tubular bodies and a stack of the plurality of second tubular bodies, respectively.

8. The heat exchanger according to claim 1, wherein the plurality of first tubular bodies and the plurality of second tubular bodies are at least one of configured and arranged symmetrically with respect to a symmetry plane extending perpendicularly to the transverse direction.

9. The heat exchanger according to claim 1, wherein the plurality of first coolant paths and the plurality of second coolant paths are at least one of configured and arranged symmetrically with respect to a symmetry plane extending perpendicularly to the transverse direction.

10. The heat exchanger according to claim 1, wherein along the transverse direction, next to each of the plurality of first tubular bodies one of the plurality of second tubular bodies is arranged, which together define a tubular body pair of a plurality of tubular body pairs, and wherein at least one of the plurality of tubular body pairs is defined by two tubular bodies substantially configured identically.

11. The heat exchanger according to claim 1, wherein along the transverse direction, next to each of the plurality of first coolant paths one of the plurality of second coolant paths is arranged, which together define a coolant path pair of a plurality of coolant path pairs, and wherein at least one of the plurality of coolant path pairs is defined by two coolant paths substantially configured identically.

12. The heat exchanger according to claim 1, wherein at least one of i) at least one of the plurality of first tubular bodies and ii) at least one of the plurality of second tubular bodies is structured as a flat tube having a tube height along the stacking direction that is one fifth or less of a tube width along the transverse direction.

13. The heat exchanger according to claim 1, further comprising a housing in which the plurality of first tubular bodies and the plurality of second tubular bodies are arranged, wherein:
the housing includes a housing lid and a housing bottom disposed on opposite sides of the plurality of first tubular bodies and the plurality of second tubular bodies in the stacking direction; and
the first coolant distributor, the second coolant distributor, the first coolant collector, and the second coolant collector each include a nozzle protruding away from the housing and beyond the housing lid in the stacking direction.

14. The heat exchanger according to claim 1, wherein:
the gas is flowable through the plurality of first tubular bodies and the plurality of second tubular bodies in the longitudinal direction; and
the coolant is flowable through the plurality of first coolant paths and the plurality of second coolant paths in the longitudinal direction.

15. The heat exchanger according to claim 1, wherein the plurality of first coolant paths are fluidically separated from the plurality of second coolant paths.

16. The heat exchanger according to claim 1, further comprising at least one separating wall arranged between and fluidically separating the plurality of first tubular bodies and the plurality of second tubular bodies, wherein:
the at least one separating wall extends in the longitudinal direction between opposing longitudinal ends of the plurality of first tubular bodies; and
the at least one separating wall extends in the stacking direction between opposing sides of the plurality of first tubular bodies.

17. The heat exchanger according to claim 1, wherein:
the first coolant distributor and the first coolant collector are arranged opposite one another along the longitudinal direction; and
the second coolant distributor and the second coolant collector are arranged opposite one another along the longitudinal direction.

18. The heat exchanger according to claim 1, wherein:
the first coolant distributor and the first coolant collector open into the plurality of first intermediate spaces on a side of the plurality of first tubular bodies opposite the plurality of second tubular bodies such that the coolant is flowable into and out of the plurality of first coolant paths in the transverse direction; and
the second coolant distributor and the second coolant collector open into the plurality of second intermediate spaces on a side of the plurality of second tubular bodies opposite the plurality of first tubular bodies such that the coolant is flowable into and out of the plurality of second coolant paths in the transverse direction.

19. An internal combustion engine for a motor vehicle, comprising an exhaust gas system, a fresh air system, and a heat exchanger, the heat exchanger including:
a plurality of first tubular bodies for being flowed through by a gas, the plurality of first tubular bodies extending along a longitudinal direction and arranged spaced apart from one another along a stacking direction extending perpendicular to the longitudinal direction;
a plurality of second tubular bodies for being flowed through by the gas, the plurality of second tubular bodies extending along the longitudinal direction and arranged spaced apart from one another along the stacking direction;
the plurality of second tubular bodies arranged next to the plurality of first tubular bodies along a transverse direction extending perpendicular to the stacking direction and perpendicular to the longitudinal direction;
a plurality of first intermediate spaces disposed along the stacking direction between the plurality of first tubular bodies, the plurality of first intermediate spaces defining a plurality of first coolant paths for being flowed through by a coolant;
a plurality of second intermediate spaces disposed along the stacking direction between the plurality of second tubular bodies, the plurality of second intermediate spaces defining a plurality of second coolant paths for being flowed through by the coolant;
the plurality of first coolant paths fluidically connected to a first coolant distributor configured to distribute the coolant to the plurality of first coolant paths and to a first coolant collector structured and arranged to collect the coolant after the coolant has flowed through the plurality of first coolant paths;
the plurality of second coolant paths fluidically connected to a second coolant distributor configured to distribute the coolant to the plurality of second coolant paths and to a second coolant collector structured and arranged to collect the coolant after the coolant has flowed through the plurality of second coolant paths;
wherein the gas is flowable through the plurality of first tubular bodies and the plurality of second tubular bodies in the longitudinal direction, and the coolant is flowable through the plurality of first coolant paths and the plurality of second coolant paths in the longitudinal direction;
wherein the first coolant distributor and the second coolant distributor are arranged opposite one another along the transverse direction and wherein the first coolant collector and the second coolant collector are arranged opposite one another along the transverse direction; and wherein the plurality of first tubular bodies and the plurality of second tubular bodies are incorporated in one of the exhaust gas system and the fresh air system.

20. A heat exchanger for an internal combustion engine, comprising:

a housing;

a plurality of first tubular bodies and a plurality of second tubular bodies through which a gas is flowable arranged within the housing, the plurality of first tubular bodies extending along a longitudinal direction and arranged spaced apart from one another along a stacking direction extending perpendicular to the longitudinal direction, the plurality of second tubular bodies extending along the longitudinal direction and arranged spaced apart from one another along the stacking direction, the plurality of first tubular bodies and the plurality of second tubular bodies arranged adjacent to one another in a transverse direction extending perpendicular to the stacking direction and to the longitudinal direction;

a plurality of first intermediate spaces disposed between the plurality of first tubular bodies along the stacking direction, the plurality of first intermediate spaces defining a plurality of first coolant paths through which a coolant is flowable;

a plurality of second intermediate spaces disposed between the plurality of second tubular bodies along the stacking direction, the plurality of first intermediate spaces defining a plurality of second coolant paths through which the coolant is flowable;

a first coolant distributor configured to distribute the coolant to the plurality of first coolant paths;

a first coolant collector structured and arranged to collect coolant that has flowed through the plurality of first coolant paths;

a second coolant distributor configured to distribute the coolant to the plurality of second coolant paths;

a second coolant collector structured and arranged to collect coolant that has flowed through the plurality of second coolant paths;

the plurality of first coolant paths having two first longitudinal ends disposed opposite one another in the longitudinal direction, the first coolant distributor arranged in a region of one of the two first longitudinal ends and the first coolant collector arranged in a region of the other of the two first longitudinal ends, the plurality of first coolant paths fluidically connected to the first coolant distributor and to the first coolant collector;

the plurality of second coolant paths having two second longitudinal ends disposed opposite one another in the longitudinal direction, the second coolant distributor arranged in a region of one of the two second longitudinal ends and the second coolant collector arranged in a region of the other of the two second longitudinal ends, the plurality of second coolant paths fluidically connected to the second coolant distributor and to the second coolant collector;

wherein the plurality of first coolant paths are fluidically separated from the plurality of second coolant paths; and wherein the first coolant distributor and the second coolant distributor are arranged opposite one another along the transverse direction and wherein the first coolant collector and the second coolant collector are arranged opposite one another along the transverse direction.

* * * * *